US009037898B2

(12) United States Patent
Arroyo et al.

(10) Patent No.: US 9,037,898 B2
(45) Date of Patent: May 19, 2015

(54) COMMUNICATION CHANNEL FAILOVER IN A HIGH PERFORMANCE COMPUTING (HPC) NETWORK

(71) Applicant: International Business Machines Corporation, Armonk, NY (US)

(72) Inventors: Jesse P. Arroyo, Rochester, MN (US); Ellen M. Bauman, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/717,921

(22) Filed: Dec. 18, 2012

(65) Prior Publication Data

US 2014/0173338 A1   Jun. 19, 2014

(51) Int. Cl.
*G06F 11/00* (2006.01)
*G06F 11/14* (2006.01)

(52) U.S. Cl.
CPC .................. *G06F 11/1412* (2013.01)

(58) Field of Classification Search
CPC .............. G06F 11/1412; G06F 11/201; G06F 11/2089; G06F 11/1068
USPC ............... 714/4.11, 4.2, 15; 370/242
See application file for complete search history.

(56) References Cited

U.S. PATENT DOCUMENTS

| | | | |
|---|---|---|---|
| 7,251,745 B2 | 7/2007 | Koch et al. | |
| 7,475,274 B2 | 1/2009 | Davidson | |
| 7,571,343 B1 | 8/2009 | Xiang et al. | |
| 7,711,977 B2 | 5/2010 | Ballew et al. | |
| 7,801,028 B2 * | 9/2010 | Jin et al. | 370/222 |
| 7,944,812 B2 * | 5/2011 | Carlson et al. | 370/217 |
| 8,275,947 B2 | 9/2012 | Arimilli et al. | |
| 2009/0328024 A1 | 12/2009 | Li et al. | |
| 2010/0097941 A1 | 4/2010 | Carlson et al. | |
| 2011/0218969 A1 * | 9/2011 | Anglin et al. | 707/679 |
| 2011/0320861 A1 * | 12/2011 | Bayer et al. | 714/5.11 |

FOREIGN PATENT DOCUMENTS

CN    101971575 A    2/2011

OTHER PUBLICATIONS

Zang et al., "Efficient TCP Connection Failover in Web Server Clusters," IEEE Infocom 2004.

* cited by examiner

*Primary Examiner* — Bryce Bonzo
*Assistant Examiner* — India Davis
(74) *Attorney, Agent, or Firm* — Wood, Herron & Evans, LLP

(57) ABSTRACT

A method, apparatus and program product implement a failover of a communication channel in a cluster fabric that transfers a state of the communication channel between windows resident in a hardware fabric interface device. The failover is desirably implemented by updating a plurality of mappings between memory resources in a host memory and hardware resources in the fabric interface device, and typically without modifying the memory resources such that involvement of a client that utilizes the communication channel in the failover is minimized or eliminated.

25 Claims, 9 Drawing Sheets

COMMUNICATION CHANNEL FAILOVER IN A HIGH PERFORMANCE COMPUTING (HPC) NETWORK

FIELD OF THE INVENTION

The invention is generally related to data processing systems, and in particular to handling communication failures in distributed data processing systems.

BACKGROUND OF THE INVENTION

It is well-accepted in the computer arts that greater computer system performance can be achieved by harnessing the processing power of multiple individual processing units. Multi-processor (MP) computer systems may implement a number of different topologies, of which various ones may be better suited for particular applications depending upon the performance requirements and software environment of each application. One common MP computer architecture is a symmetric multi-processor (SMP) architecture in which multiple processing units, each supported by a multi-level cache hierarchy, share a common pool of resources, such as a system memory and input/output (I/O) subsystem, which are often coupled to a shared system interconnect.

Although SMP computer systems permit the use of relatively simple inter-processor communication and data sharing methodologies, SMP computer systems have limited scalability. For example, many SMP architectures suffer to a certain extent from bandwidth limitations, especially at the system memory, as the system scale increases.

An alternative MP computer system topology known as non-uniform memory access (NUMA) has also been employed to addresses limitations to the scalability and expandability of SMP computer systems. A conventional NUMA computer system includes a switch or other global interconnect to which multiple nodes, which can each be implemented as a small-scale SMP system, are connected. Processing units in the nodes enjoy relatively low access latencies for data contained in the local system memory of the processing units' respective nodes, but suffer significantly higher access latencies for data contained in the system memories in remote nodes. Thus, access latencies to system memory are non-uniform. Because each node has its own resources, NUMA systems have potentially higher scalability than SMP systems.

Regardless of whether an SMP, NUMA or other MP data processing system architecture is employed, it is typical that each processing unit accesses data residing in memory-mapped storage locations (whether in physical system memory, cache memory or another system resource) by utilizing real addresses to identifying the storage locations of interest. An important characteristic of real addresses is that there is a unique real address for each memory-mapped physical storage location.

Because the one-to-one correspondence between memory-mapped physical storage locations and real addresses necessarily limits the number of storage locations that can be referenced by software, the processing units of most commercial MP data processing systems employ memory virtualization to enlarge the number of addressable locations. In fact, the size of the virtual memory address space can be orders of magnitude greater than the size of the real address space. Thus, in a conventional systems, processing units internally reference memory locations by the virtual (or effective) addresses and then perform virtual-to-real address translations (often via one or more intermediate logical address spaces) to access the physical memory locations identified by the real addresses.

Given the availability of the above MP systems, one further development in data processing technology has been the introduction of parallel computing. With parallel computing, multiple processor nodes are interconnected to each other via a system interconnect or fabric. These multiple processor nodes are then utilized to execute specific tasks, which may be individual/independent tasks or parts of a large job that is made up of multiple tasks.

In such systems, coordinating communications between the multiple processor nodes is of paramount importance for ensuring fast and efficient handling of workloads. Communication loss between coordinating processes on different computation nodes (e.g., user jobs or OS instances) has been found to lead to delay/loss of job progress, lengthy recovery, and/or jitter in the system, effectively wasting computing resources, power and delaying the eventual result.

Various MP system technologies utilize different types of communication channels to support communication between coordinating processes. For example, in MP systems implemented as high performance computing (HPC) clusters, communication channels may be implemented as "windows" that are available on one or more Host Fabric Interface (HFI) adapters. In other types of HPC clusters, the communication channels may be implemented as Queue Pairs on a Host Channel Adapter (HCA).

To address potential communication losses, some MP systems dispatch multiple identical copies of compute jobs across different computation nodes. However, doing so doubles CPU/memory resources and bandwidth usage, and requires merging/discarding results coming back from multiple sources.

Other MP systems utilize multiple active communication channels in an active/active round robin configuration. Doing so, however, additional channel resources to be assigned per end-client (compute job), additional resources to manage multiple channels, and additional overhead in user jobs or OS libraries to manage merging communications streams. Moreover, any operations queued to failed hardware will often be lost, as failure of one channel often may only be detected by a long-interval software timer.

In still other MP systems, multiple communication channels may be utilized in an active/passive configuration. However, such solutions require additional channel resources to be assigned per end-client (compute job), most of which are never used. Additional resources are also typically required to manage multiple channels, and any operations queued to the failed hardware will typically be lost. In addition, failure of one channel typically may only be detected with a long-interval software timer.

Therefore, a substantial need exists in the art for an improved manner of handling communication channel failures in an HPC cluster or other MP system, particularly for a manner of handling communication channel failures reduces the time to fail over, reduces the number of dropped packets, reduces the need for additional dedicated resources, and/or allows for more configuration flexibility than conventional approaches.

SUMMARY OF THE INVENTION

The invention addresses these and other problems associated with the prior art by providing a failover of a communication channel in a cluster fabric that transfers a state of the communication channel between windows resident in a hardware fabric interface device. The failover is desirably implemented by updating a plurality of mappings between memory resources in a host memory and hardware resources in the fabric interface device, and typically without modifying the memory resources such that involvement of a client that utilizes the communication channel in the failover is minimized or eliminated.

Therefore, consistent with one aspect of the invention, a communication channel failover in a clustered computer system is performed by establishing client access to a cluster fabric over a communication channel using a first window in a fabric interface device, where the first window defines a state of the communication channel for the client, and the window includes a plurality of mappings between memory resources allocated to the client and first hardware resources allocated to the first window in the fabric interface device, in response to detecting a failure in the communication channel, transferring the state defined by the first window to a second window by updating the plurality of mappings to map the memory resources allocated to the client to second hardware resources allocated to the second window in the fabric interface device, and restoring client access to the cluster fabric over the communication channel using the second window.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention.

DETAILED DESCRIPTION

Figure 1:
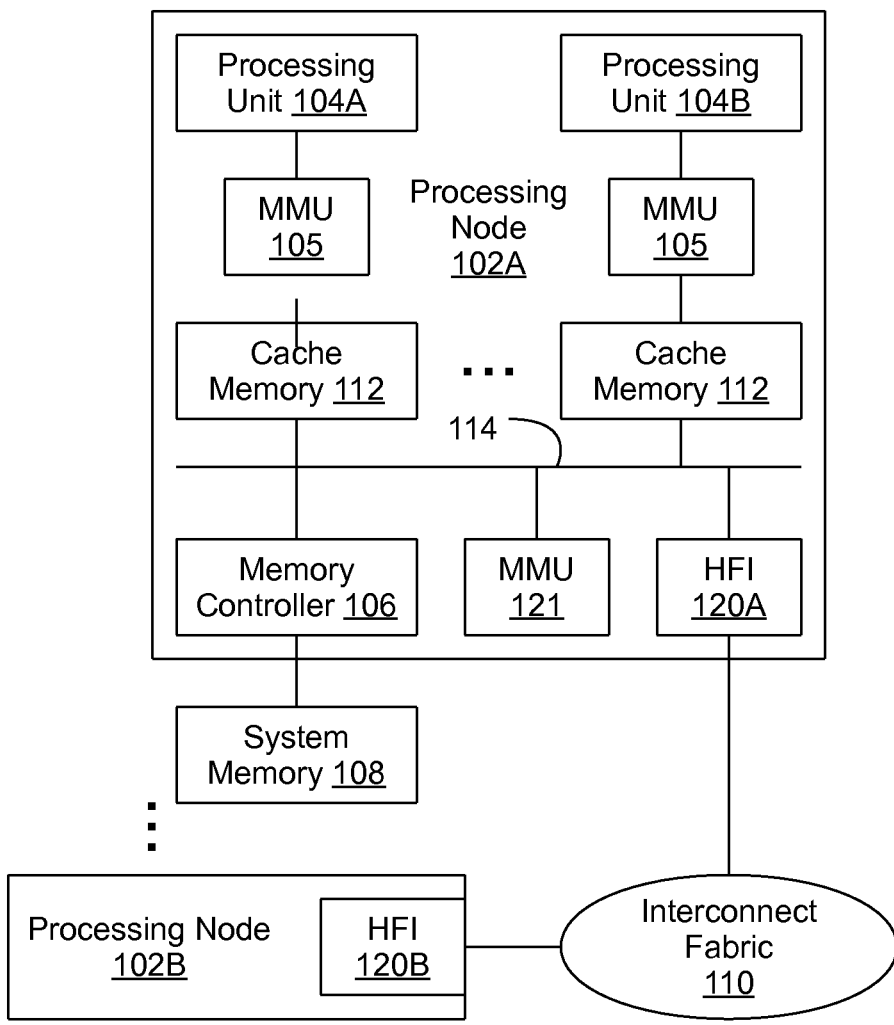
FIG. 1 illustrates an example multi-node data processing system with a host fabric interface (HFI) provided at each node to enable communication channel failover in a manner consistent with the invention.

Now turning to the drawings, wherein like numbers denote like parts throughout the several views, FIG. 1 illustrates a high-level block diagram depicting a first view of an example data processing system 100 configured with two nodes connected via respective host fabric interfaces, according to one illustrative embodiment of the invention, and within which many of the functional features of the invention may be implemented. As shown, data processing system 100 includes multiple processing nodes 102A, 102B (collectively 102) for processing data and instructions. Processing nodes 102 are coupled via host fabric interface (HFI) 120 to an interconnect fabric 110 that supports data communication between processing nodes 102 in accordance with one or more interconnect and/or network protocols. Interconnect fabric 110 may be implemented, for example, utilizing one or more buses, switches and/or networks. Any one of multiple mechanisms may be utilized by the HFI 120 to communicate across the interconnect 110. For example, and without limitation, HFI 120 may communicate via a proprietary protocol or an industry standard protocol such as Inifiniband, Ethernet, or IP (Internet Protocol).

As utilized herein, the term "processing node" (or simply node) is defined as the set of computing resources that form the domain of a coherent operating system (OS) image. For clarity, it should be understood that, depending on configuration, a single physical system may include multiple nodes. The number of processing nodes 102 deployed in a given system is implementation-dependent and can vary widely, for example, from a few nodes to many thousand nodes.

Each processing node 102 may be implemented, for example, as a single integrated circuit chip (e.g., system-on-a-chip (SOC)), a multi-chip module (MCM), or circuit board, which contains one or more processing units 104 (e.g., processing units 104A, 104B) for processing instructions and data. Further, each processing unit 104 may concurrently execute one or more hardware threads of execution.

As shown, each processing unit 104 is supported by cache memory 112, which contains one or more levels of in-line or lookaside cache. As is known in the art, cache memories 112 provide processing units 104 with low latency access to instructions and data received from source(s) within the same processing node 102A and/or remote processing node(s) 102B. The processing units 104 within each processing node 102 are coupled to a local interconnect 114, which may be implemented, for example, with one or more buses and/or switches. Local interconnect 114 is further coupled to HFI 120 to support data communication between processing nodes 102A, 102B.

As further illustrated in FIG. 1, processing nodes 102 typically include at least one memory controller 106, which may be coupled to local interconnect 114 to provide an interface to a respective physical system memory 108. In alternative embodiments of the invention, one or more memory controllers 106 can be coupled to interconnect fabric 110 or directly to a processing unit 104 rather than a local interconnect 114.

In addition to a memory controller, each processing unit 104 also includes a memory management unit (MMU) 105 to translate effective addresses to real (or physical) addresses. These MMUs 105 perform EA-to-RA translations for tasks executing on processing nodes (e.g., node 102A) of data processing system 100. However, a separate MMU 121, which is coupled to the local interconnect 114, may also be used to perform EA-to-RA translations for operations received from tasks operating on remote processing nodes (e.g., node 102B) of data processing system 100. In one implementation of processor configurations, MMU 121 may be integrated with HFI 120 so as to support EA-to-RA address translations required by HFI and/or tasks utilizing HFI to complete global shared memory (GSM) operations.

HFI 120A and functional components thereof, which are described below, enable the task(s) executing on processing units 104A/104B to generate operations to access the physical memory 108B of other nodes that are executing other tasks of the parallel job using EAs from a shared global address space (GAS) and a GSM. Likewise, HFI 120B enables access by the task(s) on initiating node 102A to access physical memory 108B when certain criteria are met.

Those skilled in the art will appreciate that data processing system 100 of FIG. 1 may include many additional components, which are not illustrated herein, such as interconnect bridges, non-volatile storage, ports for connection to networks or attached devices, etc. Because such additional components are not necessary for an understanding of the present invention, they are not illustrated in FIG. 1 or discussed further herein.

Figure 2:
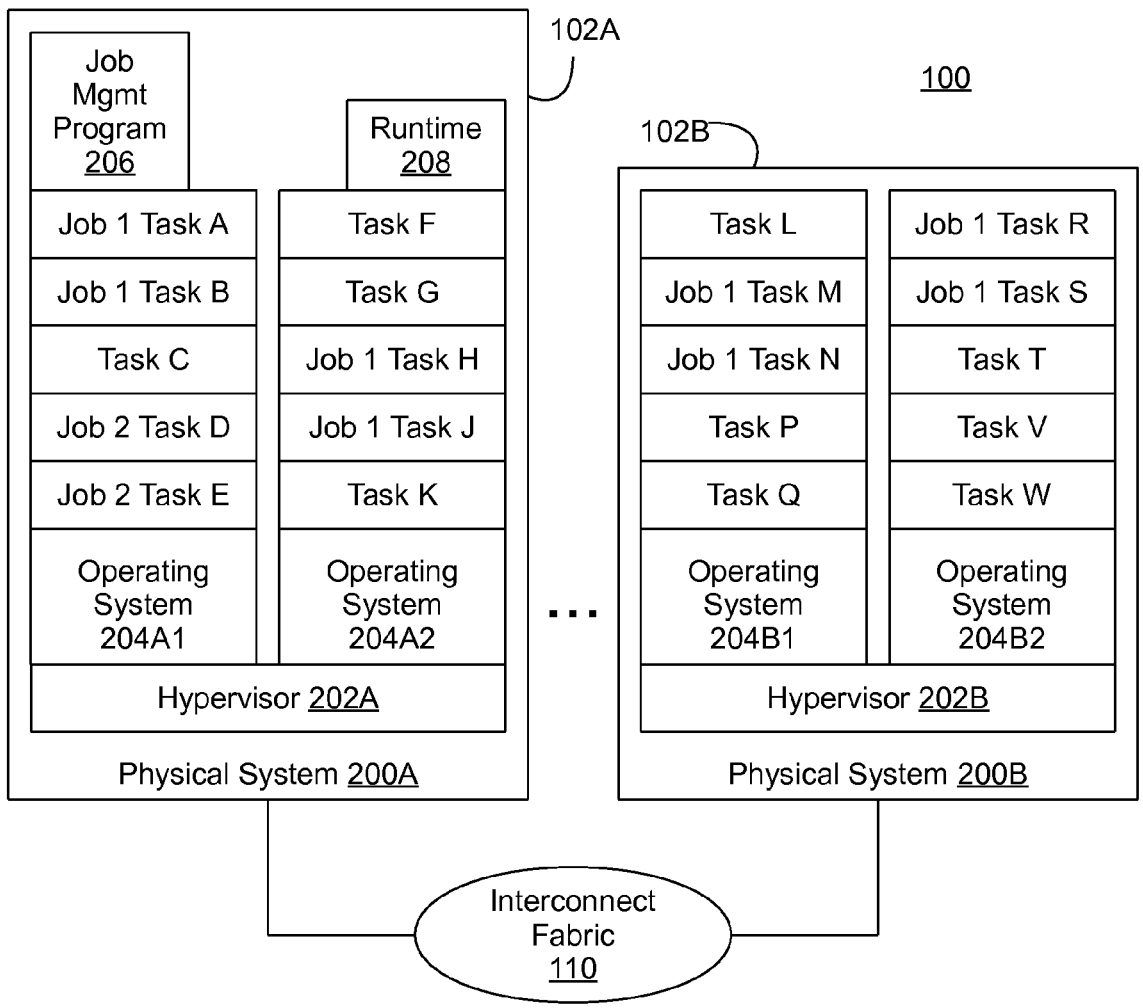
FIG. 2 illustrates the allocation of tasks of a single job across partitions and nodes within the data processing system of FIG. 1.

The above described physical representations of nodes of an example data processing systems 100 with HFIs supports the distribution of tasks associated with a parallel job across multiple nodes within a larger system with a GSM. FIG. 2 illustrates a high level view of processing multiple tasks of a parallel job within an example software environment for data processing system 100, in accordance with one example embodiment. In the example embodiment, data processing system 100 includes at least two physical systems 200A and 200B (which respectively provide processing nodes 102A and 102B of FIG. 1) coupled by interconnect fabric 110. In the depicted embodiment, each physical system 200 includes at least two concurrent nodes. That is, physical system 200A includes a first node corresponding to operating system 204A1 and a second node corresponding to operating system 204A2. Similarly, physical system 200B includes a first node corresponding to operating system 204B 1 and a second node corresponding to operating system 204B2. The operating systems 204 concurrently executing within each physical system 200 may be homogeneous or heterogeneous. Notably, for simplicity, only one node of each physical system is utilized in the descriptions of the GSM and HFI functions herein, although the features of the invention are fully applicable to tasks executing on any one of multiple nodes on a single physical system accessing physical memory of other nodes on other physical system(s).

Each physical system 200 may further include an instance of a hypervisor 202 (also referred to as a Virtual Machine Monitor (VMM)). Hypervisor 202 is a program that manages the full virtualization or para-virtualization of the resources of physical system 200 and serves as an operating system supervisor. As such, hypervisor 202 governs the creation and destruction of nodes and the allocation of the resources of the physical system 200 between nodes.

The execution of parallel jobs in data processing system 100 may also utilize global shared memory (GSM), which enables multiple nodes executing tasks of a parallel job to access a shared effective address space, referred to herein as a global address space (GAS). Thus, data processing system 100 can execute multiple different types of tasks. First, data processing system 100 can execute conventional (individual) Tasks C, F, G, K, L, P, Q, T, V and W, which are independently executed under operating systems 204. Second, data processing system 100 can execute parallel jobs, such as Job 2, with tasks that are confined to a single node. That is, Tasks D and E are executed within the node corresponding to operating system 204A1 of physical system 200A and can coherently share memory. Third, data processing system 100 can execute parallel jobs, such as Job 1, that span multiple nodes and even multiple physical systems 200. For example, in the depicted operating scenario, Tasks A and B of Job 1 execute on operating system 204A1, Tasks H and J of Job 1 execute on operating system 204A2, Tasks M and N of Job 1 execute on operating system 204B1, and Tasks R and S of Job 1 execute on operating system 204B2. As is illustrated, tasks of multiple different jobs (e.g., Job 1 and Job 2) are permitted to concurrently execute within a single node.

With standard task-to-task operation, tasks running on a same node, i.e., tasks homed on the same physical device, do not need to utilize the HFI and resolve EA-to-RA mapping beyond the standard page table. The HFI and/or MMU components are thus not utilized when exchanging operations across tasks on the same physical node. Where tasks are running on different physical nodes, however, the use of the MMU and HFI may be required to enable correct EA-to-RA translations for tasks homed at the specific node when issuing and/or receiving GSM operations.

Additional applications may optionally be executed under operating systems 204 to facilitate the creation and execution of jobs. For example, FIG. 2 depicts a job management program 206, such as Load Leveler, executing under operating system 204A1 and a runtime environment 208, such as Parallel Operating Environment (POE), executing under operating system 204A2.

Figure 3:
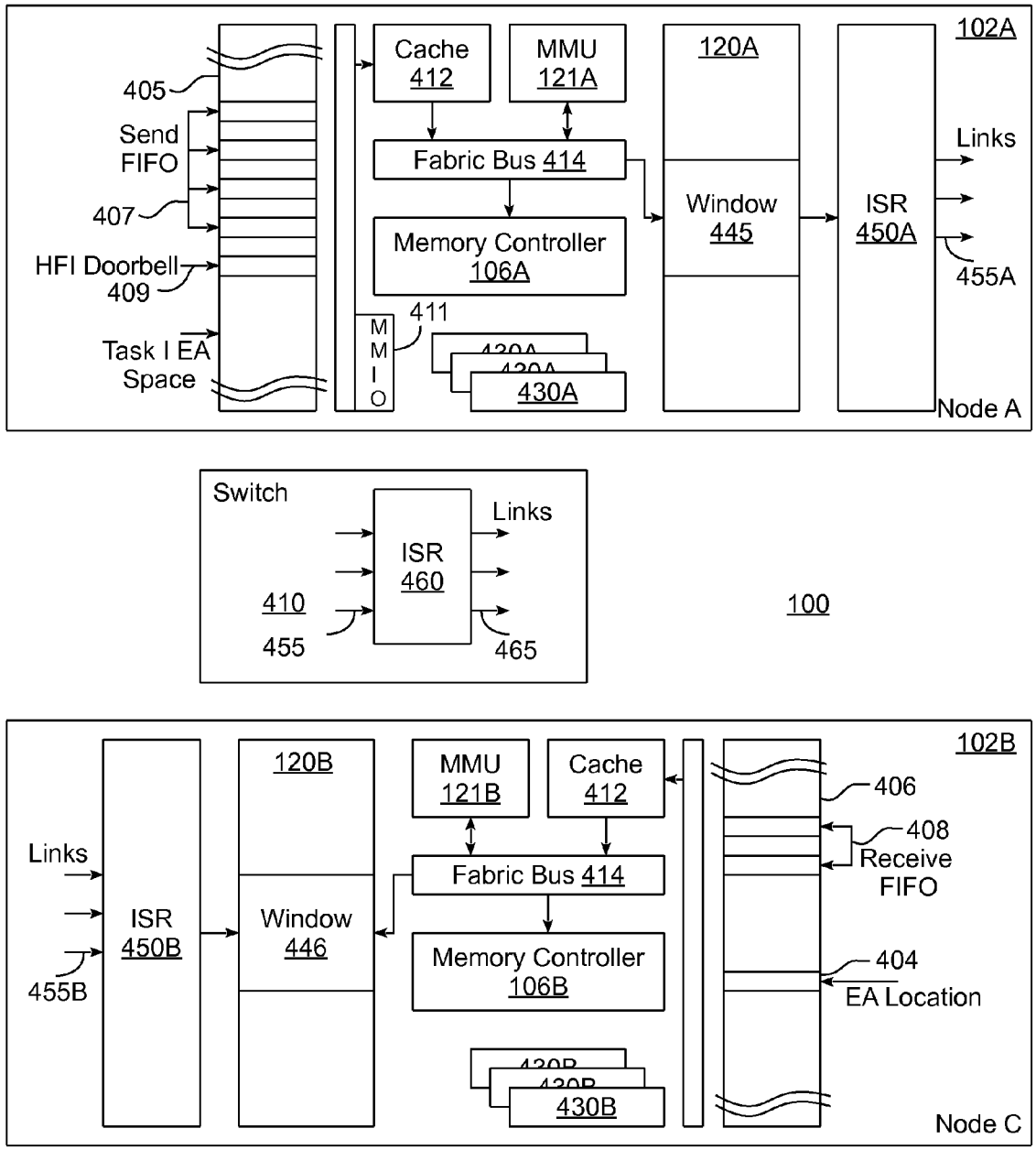
FIG. 3 is a block diagram illustrating components of an example send (initiating) node and target node utilized for processing of GSM operations in the data processing system of FIG. 1.

Referring now to FIG. 3, there is illustrated another more detailed view of the data processing system 100 of FIGS. 1 and 2 with the hardware (and software) constructs required for generation, transmission, receipt and processing of GSM operations across physical nodes within a GSM environment. First computer node 102A (initiating or sending node) and second computer node 102B (target or receiving node) includes HFI 120A, 120B, respectively. HFI 120 is a hardware construct that sits on the coherent fabric within a (processor) chip. Each HFI 120 provides one or more windows 445 (and 446) (see FIG. 4) allocated to a particular executing task of a parallel job.

When an executing task of a parallel job issues an initialization system call, the operating system (OS) of that node attempts to establish a dedicated window on the HFI for that task. If the operation succeeds, a portion of the allocated HFI window is first mapped into the task's address space. The memory mapped input output (MMIO) space includes a command area and FIFO pointers. After the appropriate portion of the task's effective address space is reserved (i.e., mapped to the physical memory), the operating system sets up the window to point to the page table for that task so that effective addresses within inbound (i.e., from the interconnect) GSM commands can be translated.

In processing system 100, first node 102A represents the sending/initiating node and is illustrated with send FIFO 407 within memory 405 that is accessible via a MMIO 411. Second node 102B represents the receiving or target node and is illustrated with receive FIFO 408 within its memory 406. It is understood that even though an asymmetric view is shown, both processing nodes 102A and 102B are similarly configured, having both send FIFO 407 and receive FIFO 408, and each node is capable of performing both send and receive functions. Within processing system 100, the HFI 120 is the primary hardware element that manages access to the interconnect. The interconnect is generally represented by links 455A, 455, routing switch 410, and a series of switch elements 450A, 450B and 460. HFI 120A thus enables a task executing on sending node (120A) to send GSM operations (with a destination or target identified by the job ID, node ID and window ID) to a receiving/target node 102B.

As further illustrated in FIG. 3, processing nodes 102 include at least one memory controller 106, which is coupled to local fabric 414 to provide an interface between HFI 120 and respective physical system memory (DIMMs) 430. Processing nodes 102 also include MMU 121, which is coupled to fabric bus 414. MMU 121 may be a part of (i.e., integrated into) HFI 120 and provides the EA-to-RA translation required for GSM operation processing by the HFI 120. Coupled to fabric bus 414 is processor cache 412, which is in turn connected to processing units of the central processor. Also illustrated is (from the perspective of the executing task), a view of the mapping of EAs to physical memory space 405 allocated to the executing task. Within this virtual view of the physical memory is a send FIFO 407 which is used to store commands and data generated by the task, prior to being processed by HFI 120 to generate GSM operations. Also illustrated is HFI doorbell 409, which is a mechanism that tracks the number of operations within send FIFO, and is utilized to alert the HFI 120 when to retrieve operations from the send FIFO 407. Similarly, receive FIFO 408 of target node 102B is located within physical memory 406, in which an EA mapping location 404 is also identified for reference.

The HFI windows 445 and 446 provide a task-level view into the node's hardware that enables GSM commands to be launched with regards to a particular task's effective address space and for the effective addresses (EA) contained within commands to be appropriately translated. HFI windows 445 are basic system constructs used for GSM operations. Each HFI 120 may contain multiple windows 445, and each window is allocated to a single task of the one or more tasks executing on the computer node 102.

Figure 4:
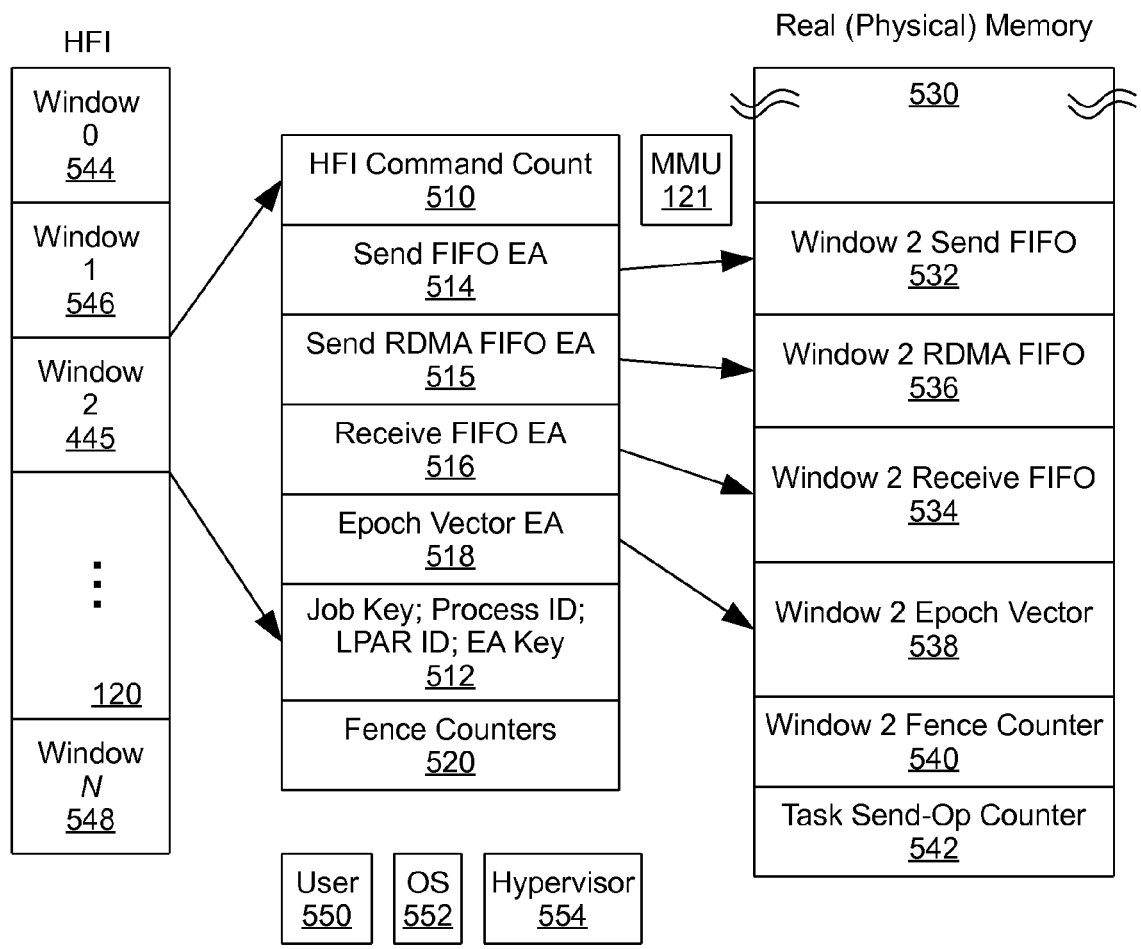
FIG. 4 illustrates a detailed view of an example HFI window and the association of window entries to specific memory locations within the real (i.e., physical) memory in the data processing system of FIG. 1.

Further functional characteristics of example HFI windows 445 are illustrated by FIG. 4. An HFI 120 may include a plurality of windows (window0 through windowN) of which HFI window2 445 is selected as the example window. Each HFI has a fixed number of windows, each of which can belong to exactly one task, although more than one window may be assigned to a task. The window assigned to a task is used by the HFI 120 to both launch GSM messages originating from the task as well as handle incoming messages accessing that task's effective address space. HFI window2 445 is accessible by task-generated commands, which may be generated at different functional levels, including by a user 550, an OS 552, and/or a hypervisor 554.

HFI window 445 includes a plurality of functional entries, such as command entries, credentials entry, an address translation entry, and data structures used by the HFI to control message transmission and reception. Specifically, as illustrated, window2 445 comprises the following entries, without limitation, HFI command count 510, send FIFO EA 514, send remote direct memory access (RDMA) FIFO EA 515, receive FIFO EA 516, epoch vector EA 518, credentials 512, and fence counters 520. In the illustrative embodiment, credentials 512 includes the job ID (also referred to herein as a job key), process ID, LPAR (logical partition) ID and EA key. The HFI references the credentials 512 to correctly authenticate an incoming GSM transaction as being authorized to perform an operation on the associated task's effective address space. It is appreciated that the different components of credentials 512 may also be represented with its own entry within HFI window2 445. Each of the above entries are registers providing a value of a memory location at which the named entry is stored or at which the named entry begins (i.e., a start location) within the effective address space of the task. These effective addresses are translated by MMU 121 into corresponding real addresses that are homed within the physical memory 530. HFI forwards one of the effective addresses of window contents to MMU 121, and MMU 121 translates the effective address into a real address corresponding to the physical memory 530 to which the EAs of the task identified by the credentials are mapped. As such, window2 445 defines a plurality of mappings between the HFI and the real (physical) memory.

HFI window2 445 also comprises one or more fence counters 520 for tracking completion of GSM operations during a local fence operation and a global fence operation. The fence counters 520 referenced by the EAs map to fence counter 540 within the real memory location assigned to the task. In order to assist with local (task-issued) fence operations, the RA space assigned to the task also includes a send-op counter 542 to track the completion of task-issued commands, which are initially stored in send FIFO 532, before passing to HFI window for processing.

Thus, as further illustrated, send FIFO EA 514 holds the start effective address for the task's send FIFO, which address can be translated by MMU 121 to point to the start (real address) of send FIFO 532 in physical memory 530. Likewise, receive FIFO EA 516 holds the start EA of the task's receive FIFO 534, which address is translated by MMU 121, and points to the start address in physical memory 530 of the receive FIFO 534 of the task. The send RDMA FIFO EA 515 and epoch vector EA 518 similarly can be translated by MMU 121 to point to the start real addresses of the send RDMA FIFO 536 and Epoch vector 538, respectively. Note that while the send FIFO 514 and receive FIFO 516 may be contiguous in the effective address space of the task to which that window corresponds, these FIFOs (514, 516) may be discontiguous in real (physical) memory 530.

Each HFI window contains key resources including the pointer to the address translation tables that are used to resolve the effective address (with respect to a particular task) into a real address. The window number within the HFI that is allocated for the GSM initialization operation is returned back to the user as an opaque handle, which may contain an encoding (embedding) of the node and window number, along with the effective address where the global address space is reserved within that task's effective address space. The language run-time takes on the responsibility for communicating each task's window identity to all other tasks that wish to issue GSM commands to that task. If a task has multiple threads of control, atomicity to the HFI window has to be ensured either through normal intra-task locking primitives, or by assigning each thread its own distinct HFI window. Finally, HFI performance counters for all traffic based on that window are also mapped into the task's address space. This permits the task to easily monitor statistics on the interconnect traffic.

HFI windows may be shared amongst one or more logical partitions. If a single node is partitioned, the operating system running on a partition may only have access to a subset of the total number of supported windows. The OS may further reserve a subset of these windows for kernel subsystems such as the IP device driver. The remaining windows may be available for use by the tasks executing within that partition.

When a window is allocated on the HFI, the operating system tags the window with the identity of the job to which the task belongs. During issuance of GSM operations, all outgoing packets are automatically tagged by the HFI with the job ID. Outgoing packets also specify a particular window on the destination/target node's HFI 1208 in whose context the GSM effective address must be translated. The HFI compares the job ID contained within the GSM packet against the job ID contained within the window. If the job ID's do not match, the packet is silently discarded. Statistics that count such packets can be used to gently dissuade system users from either unintentionally or maliciously flooding the system with such packets.

Thus, unauthorized access to a task's effective address space is not permitted during the course of global shared memory operations. A task is able to send a GSM operation to any task belonging to any job running anywhere in the entire system. However, the HFI will perform the GSM operations on the targeted task's effective address space if and only if an incoming GSM command belongs to the same job as the task whose address space the command manipulates. A further granulation of job IDs is also possible, whereby a task can give specific authorization to only a subset of the tasks executing within the job. This can be done by a subset of the tasks requesting a different job ID to be associated to them, causing that job ID to be installed into the HFI window associated with these tasks.

Further details regarding the use of windows to communicate data over a fabric interconnect may be found, for example, in U.S. Pat. No. 8,275,947 to Arimilli et al. and assigned to the same assignee as the present application, which is incorporated by reference herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by a data processing system. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

In addition, it will be appreciated that embodiments of the invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Communication Channel Failover in a High Performance Computing (HPC) Network

Embodiments consistent with the invention implement a fast and efficient communication channel failover in an HPC network, e.g., as used in an HPC cluster or other multi-processor distributed data processing system. In HPC clusters, communication loss between coordinating processes on different computation nodes (e.g., user jobs or OS instances) can lead to delay/loss of job progress, lengthy recovery, and/or jitter in the cluster, effectively wasting computing resources, power and delaying the eventual result. Various HPC cluster technologies utilize different types of communication channels to support communication between coordinating processes.

In Power 7-based clusters, for example, as available from International Business Machines Corporation, the assignee of the present application, communication channels are characterized by windows that are available on one or more Host Fabric Interface (HFI) adapters. An HFI provides user access to an interconnect fabric via the aforementioned windows, and a window within the context of the invention is considered to be a set of configurable resources with which a software client, or endpoint (which can be, for example, a protocol, a logical partition, a device driver, a user level job, etc.) can exchange messages and data on the interconnect fabric with another client or endpoint. The configuration is provided via MMIO mapped registers, and the HFI hardware has direct access to memory provided by the software client (e.g., FIFOs, data buffers), with the collection of registers and memory shared by the hardware and software referred to hereinafter as the "window resources". The windows thus effectively define a state of a given communication channel.

For the purposes of this disclosure, however, the term "window" may be used to represent HFI windows, as well as similar constructs utilized in other interconnect fabrics, and resident in other types of fabric interface devices. For example, in Infiniband clustering, the communication channels are defined by Queue Pairs on a Host Channel Adapter (HCA), and as such the term window may be considered herein to also describe Infiniband Queue Pairs or any other entities in other distributed data processing systems that are used to define the state of a communication channel between a pair of endpoints coupled to an interconnect fabric.

Generally, a window is associated with a given endpoint, and is used to interface that endpoint with another endpoint through communication with another window associated with the other endpoint. An endpoint, for example, may be a protocol, a user program, an operating system, a job, a task, etc., and a window may include, for example, send and receive queues, as well as other registers and data that collectively define a state of a communication channel.

In the embodiments discussed hereinafter, for example, each window may include a set of resources that maintain state and can be transferred from a failed window to another window to be restarted, including, for example, various FIFOs, each including a buffer within host memory as well as configuration registers (e.g., producer and consumer offsets, size, addresses, etc.). The FIFOs may include, for example, send FIFOs, which are used by software to queue various types of operations to the window, receive FIFOs, which are used by the hardware to queue operations and completions to the software, receive descriptor FIFOs, which are used by the software to provide data receive buffers to the hardware, and pending/special FIFOs, which are used by the hardware to queue outgoing operations, such as (but not limited to) RDMA completion notification packets. The window resources may also include RDMA context information, which is used by the hardware for RDMA flows, and cached in the hardware, but stored in host memory, completion vectors, which act as consumer progress indicators, and which are written by the hardware into host memory to allow a software client to avoid MMIO reads, and additional registers with other static configuration information (e.g., protection information such as keys and protection information used in memory translation). Generally, information regarding the various FIFOs in host memory, e.g., head and tail pointers and size information, is maintained in registers in the fabric interface device.

A window, in this context, includes resources that are resident in each of the fabric interface device (e.g., an HFI or HCA) and a host memory, with the former being referred to herein as hardware resources and the latter being referred to as memory resources. In addition, in the illustrated embodiments, aspects of a window, e.g., some of the memory resources, are resident in a hypervisor. In addition, from the perspective of the herein-described failover protocol, a window may more generally be considered to include a plurality of mappings between hardware registers and other hardware resources in an HFI or other fabric interface device and memory access registers and other memory resources in a host memory, which enable, for example, the HFI to perform memory transfers to and from the various queues in the host memory. These mappings may include, for example, a send FIFO mapping, a receive FIFO mapping, an RDMA FIFO mapping, etc.

Embodiments consistent with the invention implement a failover protocol that desirably minimizes or eliminates involvement of a software stack in the failover process, which accelerates recovery from a communication channel failover. In some embodiments, it is desirable to "hold off" a client from accessing a window (e.g., by asserting a page fault) such that the client may resume work as soon as the hold is released. Furthermore, it is desirable in many embodiments to minimize any pointers to software regions associated with a window so that the recovery actions required of a client in a failover are reduced if not eliminated entirely.

A failure may result, for example, due to a hardware error in a register, a loss of communication to the fabric, a state machine that hangs and effectively locks up a send or receive queue, or another reason. The failover incorporates in part the transfer of a window state from a failed window to a new window, which enables the new window to reuse the same register settings and memory spaces, e.g., for the pending queues such as the RDMA completion notifications, to eliminate the need to establish a new window and communication channel from scratch, and often preventing prevents additional traffic from being lost, reducing recovery time.

Figure 5:
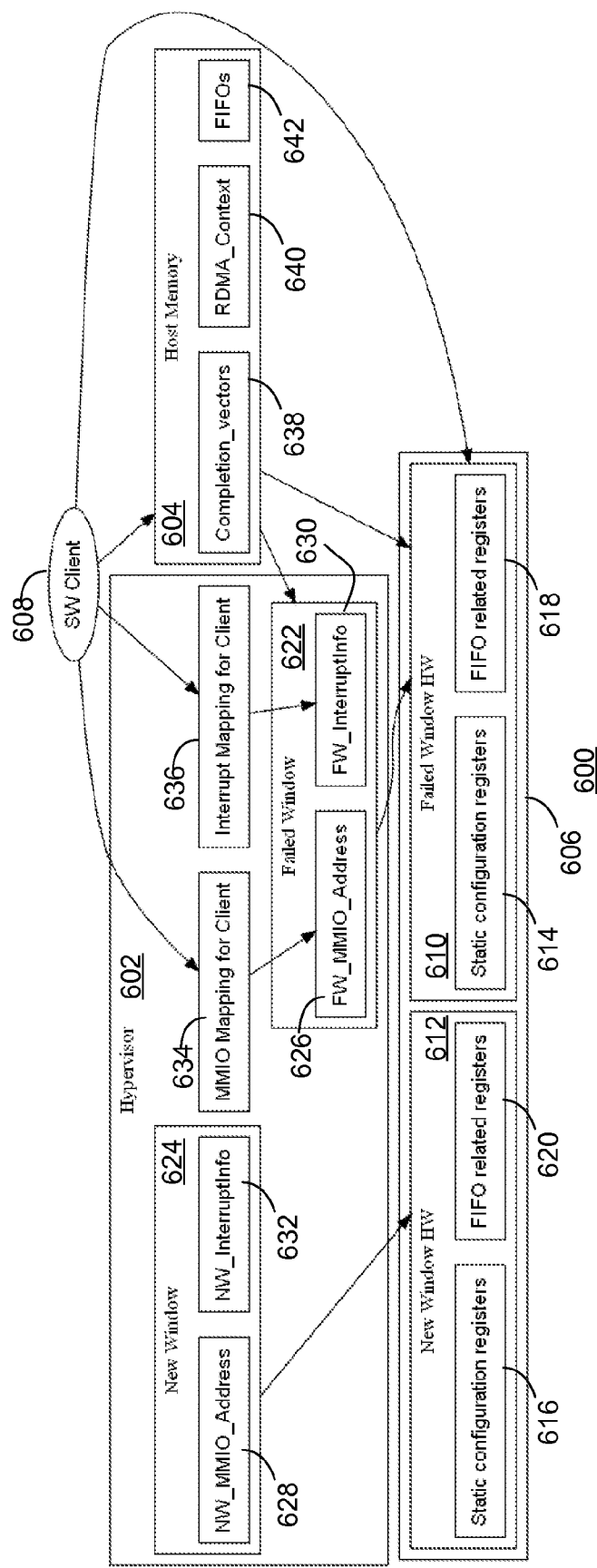
FIG. 5 is a block diagram illustrating an example data processing system prior to a communication channel failover in a manner consistent with the invention.

As shown in FIG. 5, in one embodiment a data processing system 600 may include a hypervisor 602, host memory 604 and HFI 606. A software client 608, which may be an operating system, application, job, task or other appropriate software entity capable of serving as an endpoint in data processing system 600, accesses an interconnect fabric via components 602, 604 and 606.

HFI 606 includes a plurality of windows, e.g., windows 610, 612. Typically, any hardware fabric interface device will support a fixed number of windows, e.g., as defined at boot time or as defined statically in the hardware. Initially, software client 608 is coupled to window 612 in HFI 606, but for the purposes of this discussion, it is assumed that a failure has occurred in window 610, and that window 612 is currently unused by any other clients. Windows 610, 612 are illustrated as each including a set of static configuration registers 614, 616, as well as a set of FIFO related registers 618, 620.

Within hypervisor 602, windows 610, 612 have respective window data structures 622, 624, each including in part firmware MMIO address data 626, 628 and firmware interrupt data 630, 632. Hypervisor 602 also includes a set of MMIO and interrupt mappings 634, 636 for client 608. Also disposed in host memory 604 is a set of completion vectors 638, RDMA context data 640 and a set of FIFO's 642.

The interconnect fabric in the illustrated embodiments routes packets via an "ISR_ID" and a packet number. Every packet on the cluster fabric contains a source ISR_ID/window pair and a destination ISR_ID/window pair. In addition, it is assumed that the memory shared between the client and the hardware for each window makes use of address virtualization via a memory management unit (I/O MMU). The I/O MMU provides a mapping of the virtual address space that the client uses for the shared memory to the physical address space that the hardware uses for that same memory. In this example, both the failed window and the new window access the same IO MMU, so the memory used for the FIFOs and other host memory structure does not need to be remapped.

In embodiments consistent with the invention, software client 608 is initially provided with access to the fabric interconnect via window 610 in HFI 606 to provide a communication channel to one or more other clients. A plurality of mappings, including, for example, mappings for one or more FIFOs such as send and receive FIFOs and an RDMA FIFO in the physical memory (as discussed above in connection with FIG. 4), are specified by registers 618.

In response to detecting a failure in the communication channel, embodiments consistent with the invention transfer the state of the communication channel, as defined by window 610, to another window, e.g., window 612, by updating the mappings to map the memory resources allocated to the client to second hardware resources allocated to the second window in the fabric interface device, e.g., by updating registers 620 in new window 612 to point to the FIFOs allocated to the client. At such a point, client access to the cluster fabric over the communication channel may be restored using the second window.

In this example embodiment, the existing HFI hardware available on a Torrent I/O Hub, available from International Business Machines, may be used to implement the herein-disclosed functionality. However, it will be appreciated that this approach may be utilized in connection with practically any other I/O hardware that: (1) maintains channel state in hypervisor readable registers and host memory structures; and (2) a channel can be started with an arbitrary state.

Figure 6:
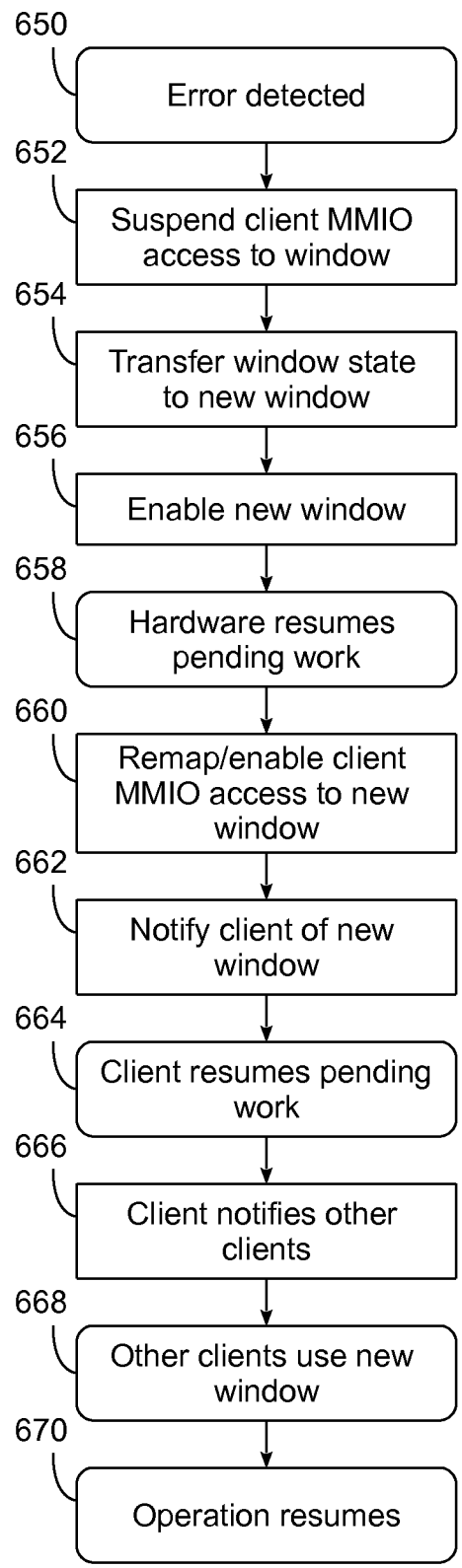
FIG. 6 is a high level flowchart illustrating an example sequence of operations used to implement a communication channel failover in the data processing system of FIG. 5.

Routine 650 of FIG. 6, for example, illustrates a high level flow of the operations that may occur in connection with a communication channel failure in the data processing system of FIG. 5. Routine 650 may be triggered, for example, in response to the stimulus of a communication loss (e.g., due to a detected hardware error, or a network reconfiguration), resulting in the error being signaled to the hypervisor.

In block 652, the hypervisor may suspend client MMIO access to the window, and in block 654, transfer the window state to a new window. Suspension of client access may be implemented, for example, by asserting a page fault so that, from the perspective of the client, the client operates as if it were waiting on a page fault to be resolved. The transfer of window state typically involves copying the hardware registers for the failed window into the corresponding registers for the new window.

Next, in block 656, the new window is enabled, thereby enabling the hardware to resume pending work (block 658). Thus, for example, any pending work present in a send or receive queue can be immediately resumed, and as such, the pending work need not be discarded as is the case in many conventional approaches.

Then, in block 660, the client access to the old window is remapped to the new window, and in block 662, the hypervisor informs the client of the failover to the new window, enabling the client to resume pending work (block 664). For example, the page table may be updated to point to the registers in the new window, thereby causing the page fault to resolve and enabling the client to resume. In addition, notification of the client may involve notifying the client of the failure of the old window and the identifier of the new window, such that all future communications by the client will occur by referencing the new window.

Thereafter, the client may inform peer clients of the change to the new window in block 666, such that other clients begin to use the new window (block 668). Operation then resumes in block 670. In one embodiment, for example, a special packet type may be defined to provide each peer client with the old and new addresses for the client such that each peer client may update its address accordingly. Notification of such clients may enable any lost packets from the peers to be detected and retried by the peers.

In some embodiments, when restarting a current packet may be skipped, with work resumed using the next packet in a FIFO so that in the event that the current packet was the cause of the failure, the communication channel will not hang again due to the packet being retried.

Figure 7A:
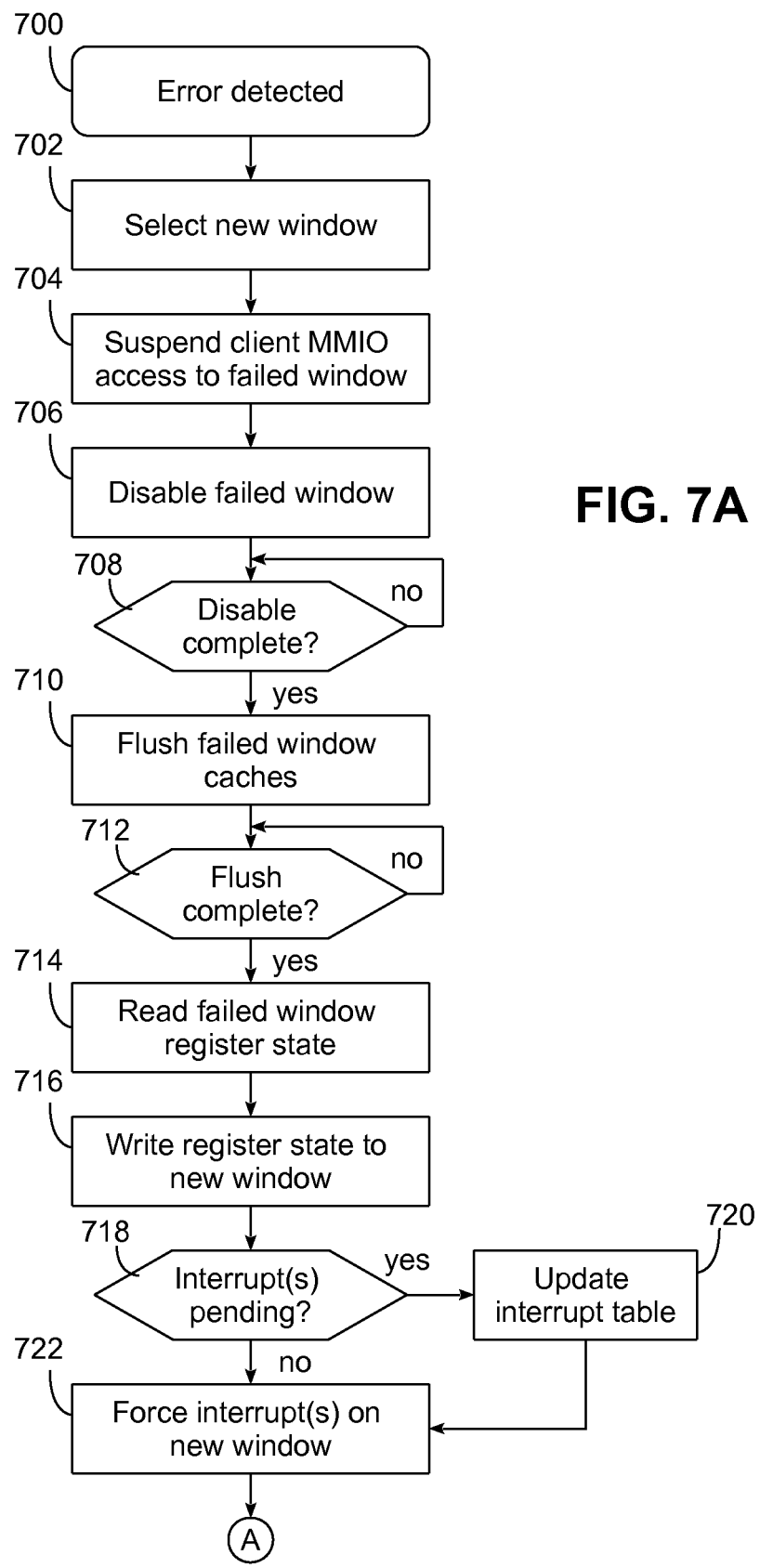
FIGS. 7A-7B are a flowchart illustrating in greater detail an example sequence of operations used to implement a communication channel failover in the data processing system of FIG. 5.
Figure 7B:
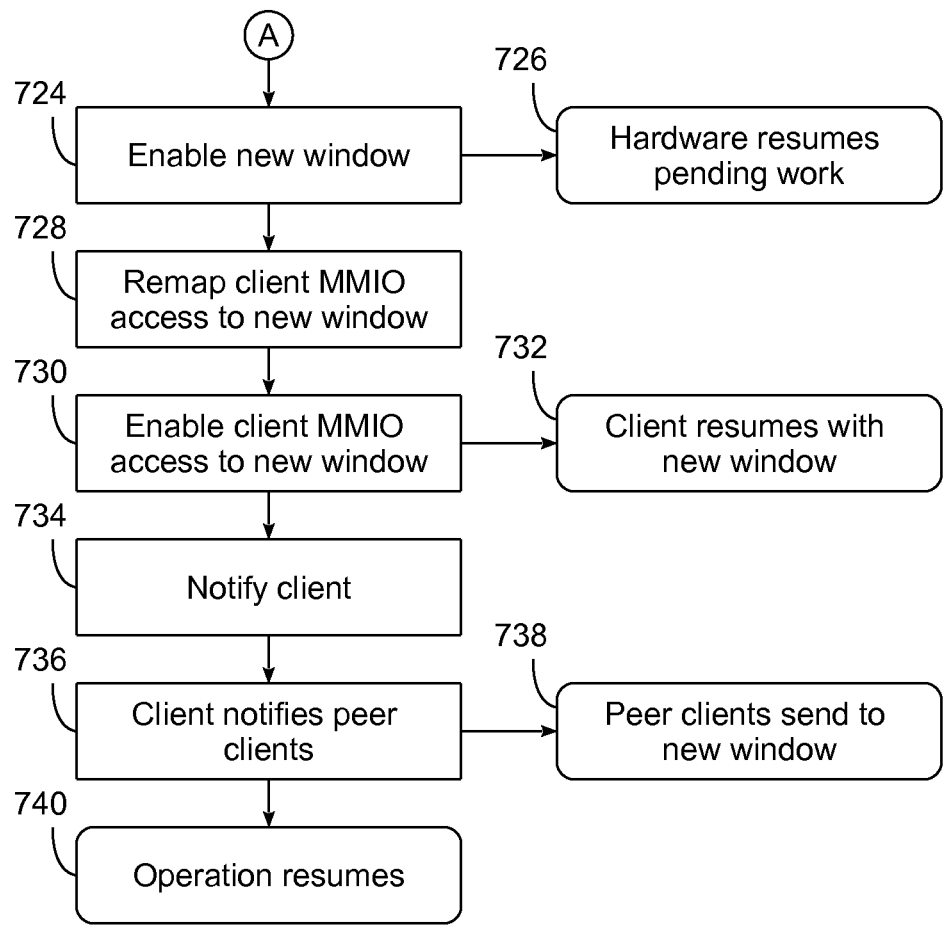

Now turning to FIGS. 7A and 7B, a more detailed flowchart is provided for a routine 700 suitable for performance by a hypervisor to implement a communication channel failover in data processing system 600 of FIG. 5.

First, in block 702, a new "destination" window is selected from the pool of available windows. The selected window is removed from the pool of available windows. The pool of available windows may be defined, for example, by being pre-reserved prior to LPAR boot, by being "donated" by an LPAR, etc.

Next, in block 704, client MMIO access to the failed window is suspended to prevent the software from further access to the register space of the hardware, allowing the hypervisor to process the failover without the hardware state being changed. Then, in block 706, the failed window is disabled to ensure that any in progress DMAs are completed prior to the following steps. Block 708 waits until the disable is complete.

Next, in block 710, cached information is flushed. The HFI hardware as well as other communication devices can cache frequently used structures (such as the RDMA context) within the hardware to increase performance. As this state needs to be transferred, flushing the hardware caches allows the hypervisor to ensure the destination window has the current information when started. Block 712 waits until this flush is complete.

Next, in block 714, the critical register information is read from the failed window, including all of the queue and buffer addresses, producer/consumer offsets, and other information that the hardware uses to manage the communication that is not stored in the host memory areas. Then, in block 716 this critical register information is written to the selected destination window.

Next, in block 718 it is determined whether any interrupts are pending. If so, control passes to block 720 to update an interrupt table. Hypervisor internal memory structures for interrupt routing are updated to ensure that any hardware interrupts from the destination window are routed to the same interrupt handle expected by the software client. The hypervisor stores or (can calculate) the interrupt numbers for each window. Then, if no interrupts are pending, or after the interrupt table is updated, control passes to block 722 to force interrupt(s) if needed on the new window. If the hardware state retrieved in block 714 indicates that there is an interrupt that is outstanding or needs to be serviced, the new window is set to force the same interrupt(s) to ensure that the software client is notified.

Next, in block 724, the destination window is enabled, allowing the destination window to begin processing pending work in the FIFOs as soon as possible (block 726). Then, in block 728, the client MMIO access is remapped to point to the destination window instead of the failed window, such that MMIO accesses by the software client will now arrive at the destination window instead of the failed window. In the illustrated embodiment, the client is not required to ask the OS/hypervisor to update the page table, as this transparently occurs.

Next, in block 730, the client MMIO access to the new window is enabled, permitting MMIO accesses to the window to complete, and letting the software client interact with the hardware (block 732). In the illustrated embodiment, the client may not yet be aware of the failover, but may nonetheless resume in-progress activities with the new window. Thus, in block 734, the client is notified of the failover, e.g., by the hypervisor sending a message to the client indicating the failover. The message may include the relevant information including the old and new windows, providing the client with the new addressing information. Thereafter, in block 736, the client may notify each peer of the new window, e.g., either by an in-band network message or an out-of-band communication via another network or job control management. As a result, peer client will thereafter send communications to the software client via the new window (block 738), and normal operation may thereafter resume (block 740).

Figure 8:
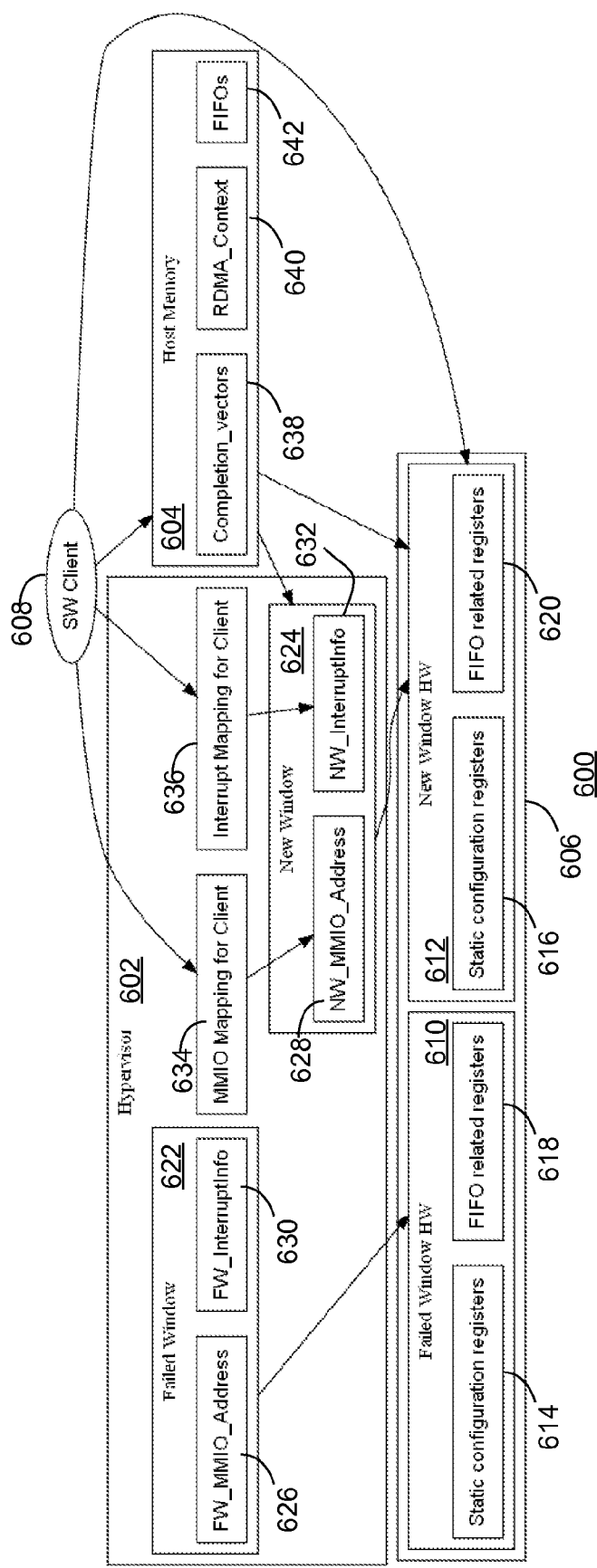
FIG. 8 is a block diagram illustrating the data processing system of FIG. 5 after a communication channel failover in a manner consistent with the invention.

FIG. 8, for example, illustrates the data processing system of FIG. 5, after a failover occurs from the failed window 610 to the new window 612. As shown, pointers and mappings are updated such that, from the perspective of software client 608, the connection may proceed using new window 612.

Embodiments consistent with the invention provide a number of advantages over conventional failover approaches. For example, operations waiting in send FIFOs or not yet processed in receive FIFO(s) are typically not lost, whereas in conventional approaches the packets in any of the FIFOs are typically lost, leading to longer software recovery times and job interruption, as well as jitter in the HPC cluster, wasting power and capability. Embodiments consistent with the invention therefore typically reduce the number of lost packets, thereby reducing or eliminating long software recovery times.

In addition, as compared to approaches that rely on multiple copies of compute jobs, there is typically no need to duplicate compute/communication resources, leading to less management overhead, and avoiding the doubling of CPU/memory resources, the doubling of cluster bandwidth usage, the need for merging/discarding results coming back from multiple sources as is typically associated with the use of multiple copies of compute jobs.

As compared to approaches that rely on multiple active channels operating in round robin, resource consumption is typically lower, and there is typically less overhead for the performance path. Furthermore, typically no additional active windows need to be allocated, thereby freeing windows for other jobs. Fewer windows often leads to less client and hypervisor memory used for the queues and memory mapping, and there is typically less process complexity to handle traffic across multiple windows. Either the saved resources can be applied toward memory hungry compute jobs or towards communication channels for other purposes on the same system. Furthermore, long software recovery times for lost messages are still typically a problem with a round robin configuration.

In addition, as compared to approaches that rely on multiple channels operating in active/passive modes, resource consumption is also typically lower, as no standby windows need to be allocated, freeing them up for other jobs. Fewer windows typically leads to less client and hypervisor memory used for the queues and memory mapping, and there typically is less process complexity to handle traffic across multiple windows. Either the saved resources can be applied toward memory hungry compute jobs or towards communication channels for other purposes on the same system. Also, long software recovery times for lost messages are still typically a problem with active/passive channel configurations.

Various additional modifications may be made to the disclosed embodiments without departing from the spirit and scope of the invention. Therefore, the invention lies in the claims hereinafter appended.

What is claimed is:

1. A method of performing a communication channel failover in a clustered computer system, the method comprising:
   establishing client access for a client in a computing node to a cluster fabric over a communication channel using a first window in a fabric interface device, wherein the first window defines a state of the communication channel for the client, the first window including a plurality of mappings between memory resources allocated to the client in the computing node and first hardware resources allocated to the first window in the fabric interface device;
   in response to detecting a failure in the communication channel, transferring the state defined by the first window to a second window by updating the plurality of mappings to map the memory resources allocated to the client to second hardware resources allocated to the second window in the fabric interface device; and
   restoring client access to the cluster fabric over the communication channel using the second window.

2. The method of claim 1, wherein the first window comprises a failed window, and wherein the second window is selected from a pool of available windows.

3. The method of claim 1, wherein the fabric interface device comprises a host fabric interface (HFI) device.

4. The method of claim 1, wherein the memory resources includes at least a send queue and a receive queue.

5. The method of claim 1, further comprising:
   prior to transferring the state, suspending client access to the first window by asserting a page fault associated with the first window in a page table; and
   after transferring the state, enabling client access to the second window by updating the page table to point to the second window and thereby resolve the page fault.

6. The method of claim 1, further comprising, prior to transferring the state, flushing at least one hardware cache associated with the first window.

7. The method of claim 1, further comprising:
   updating an interrupt table to update an interrupt associated with the first window; and
   forcing an interrupt on the second window.

8. The method of claim 1, further comprising remapping client access to the second window.

9. The method of claim 8, further comprising enabling the second window prior to remapping client access to the second window such that the fabric interface device resumes pending work for the second window.

10. The method of claim 8, further comprising enabling client access to the second window after remapping client access to the second window.

11. The method of claim 10, wherein enabling client access enables pending work for the client to resume, the method further comprising notifying the client of the failover after pending work for the client has resumed.

12. The method of claim 11, further comprising, in the client, notifying at least one peer client of the second window after the client is notified of the failover.

13. An apparatus, comprising:
   a computing node including a fabric interface device configured to provide client access for a client in the computing node to a cluster fabric over a communication channel using a first window among a plurality of windows in the fabric interface device, wherein the first window defines a state of the communication channel for the client, the first window including a plurality of mappings between memory resources allocated to the client in the computing node and first hardware resources allocated to the first window in the fabric interface device, wherein the fabric interface device comprises a hardware fabric interface device; and
   program code configured to perform a communication channel failover in the computing node, the program code configured to, in response to detecting a failure in the communication channel, transfer the state defined by the first window to a second window among the plurality of channels by updating the plurality of mappings to map the memory resources allocated to the client to second hardware resources allocated to the second window in the fabric interface device, and restore client access to the cluster fabric over the communication channel using the second window.

14. The apparatus of claim 13, wherein the first window comprises a failed window, and wherein the second window is selected from a pool of available windows.

15. The apparatus of claim 13, wherein the fabric interface device comprises a host fabric interface (HFI) device.

16. The apparatus of claim 13, wherein the memory resources includes at least a send queue and a receive queue.

17. The apparatus of claim 13, wherein the program code is further configured to, prior to transferring the state, suspend client access to the first window by asserting a page fault associated with the first window in a page table, and after transferring the state, enable client access to the second window by updating the page table to point to the second window and thereby resolve the page fault.

18. The apparatus of claim 13, wherein the program code is further configured to, prior to transferring the state, flush at least one hardware cache associated with the first window.

19. The apparatus of claim 13, wherein the program code is further configured to update an interrupt table to update an interrupt associated with the first window, and force an interrupt on the second window.

20. The apparatus of claim 13, wherein the program code is further configured to remap client access to the second window.

21. The apparatus of claim 20, wherein the program code is further configured to enable the second window prior to remapping client access to the second window such that the fabric interface device resumes pending work for the second window.

22. The apparatus of claim 20, wherein the program code is further configured to enable client access to the second window after remapping client access to the second window.

23. The apparatus of claim 22, wherein the program code is configured to enable client access to enable pending work for the client to resume, and notify the client of the failover after pending work for the client has resumed.

24. The apparatus of claim 23, wherein the program code is further configured to, in the client, notify at least one peer client of the second window after the client is notified of the failover.

25. A program product, comprising:

a computer readable storage medium; and program code stored on the computer readable storage medium and configured to perform a communication channel failover in a computing node including a fabric interface device configured to provide client access for a client in the computing node to a cluster fabric over a communication channel using a first window among a plurality of windows in the fabric interface device, wherein the first window defines a state of the communication channel for the client, the first window including a plurality of mappings between memory resources allocated to the client in the computing node and first hardware resources allocated to the first window in the fabric interface device, and wherein the program code is configured to, in response to detecting a failure in the communication channel, transfer the state defined by the first window to a second window among the plurality of channels by updating the plurality of mappings to map the memory resources allocated to the client to second hardware resources allocated to the second window in the fabric interface device, and restore client access to the cluster fabric over the communication channel using the second window.

* * * * *